United States Patent Office 2,952,704
Patented Sept. 13, 1960

2,952,704

REFINING PHTHALIC ACIDS

Stanford J. Hetzel, Newtown Square, Pa., assignor to Sun Oil Company, Philadelphia, Pa., a corporation of New Jersey No Drawing. Filed Nov. 14, 1957, Ser. No. 696,321

1 Claim. (Cl. 260—525)

This invention relates to improving the color and other properties of phthalic acid produced by liquid phase partial oxidation of xylene.

It is known in the art to partially oxidize m-xylene, p-xylene and mixtures thereof in liquid phase by contact with an oxygen-containing gas at a temperature for example within the approximate range from 250° F. to 400° F. A metallic oxidation catalyst such as cobalt naphthenate, cobalt toluate, cobalt acetylacetonate is usually employed. The products of the oxidation include solid crystalline phthalic acid. The crystals are usually filtered from liquid constituents of the oxidation mixture, such constituents usually including unreacted xylene, some toluic acid, etc.

The solid phthalic acids obtained in prior art operation have frequently been characterized by an undesirable color, usually of an amber nature. The nature of the materials causing the color is not definitely known. It may be attributable to polymeric materials formed during the oxidation.

According to the present invention, a novel process is provided for decolorizing and otherwise improving phthalic acids produced as described previously. This is accomplished according to the invention by contacting the solid acids with a liquid ketone containing up to 6 carbon atoms in the molecule, e.g. acetone, methyl ethyl ketone, methyl isobutyl ketone, etc., acetone being preferred. It has been found that the ketone is capable of removing completely or substantially completely the materials which cause the undesirable color in the phthalic acids. Other materials, such as monobasic acids, metallic catalyst, etc. are also removed in ketone treatments.

The ketone employed according to the present invention has very low solvent capacity for either isophthalic acids or terephthalic acids. Dissolving of color bodies, etc. by the ketone is therfore substantially selective and the ketone phase, after separation from the decolorized acid phase, contains only small amounts of phthalic acids. The amount in some instances is sufficiently small that the acids dissolved in the ketone phase can be discarded from the system. In other instances, it may be desirable to return the phthalic acids recovered from the ketone phase to the oxidation zone, provided that color bodies associated with the acid and returned to the oxidation zone do not build up undesirably in the oxidation system.

The ketone phase which is separated from the decolorized acid phase contains xylenes which were associated with the filtered crystals. The ketone phase is preferably distilled to remove first the ketone, and then the xylenes, the ketone being recycled to the decolorizing operation and the xylenes being recycled to the oxidation zone. The residue can then be discarded. Alternatively the distillation is performed in such manner that the ketone alone is removed and the residue including xylene recycled to the oxidation zone.

The treated acids, after separation from the ketone decolorizing agent, contain ketone remaining in association with the crystals, the ketone having largely displaced the xylene previously associated with the crystals. In the embodiment as subsequently described where a subsequent separation of isophthalic acid from terephthalic acid by means of an alcohol is performed, the ketone becomes incorporated in the alcohol phase and can usually be separated therefrom by distillation. The ketone distillate can then be recycled to the decolorizing operation and the alcohol distillate to the separation step. The absence of xylene in the alcohol system is often advantageous in order to avoid azeotrope problems which would otherwise arise.

The contacting of ketone with phthalic acids according to the invention is preferably carried out at a temperature within the approximate range from room temperature to 400° F., more preferably not greater than 300° F. The amount of ketone employed is preferably within the approximate range from 1 to 10 weight units per unit weight of phthalic acid mixture, more preferably not more than 5.

If desired a modifying solvent such as water can be employed in order to reduce the solvent power of the ketone for phthalic acids and reduce the amount of phthalic acids which dissolve in the decolorizing agent. However such operation is not essential, and satisfactory results can be obtained in many instances employing a ketone in the absence of a modifying solvent.

The contacting of ketone with solid phthalic acid can be performed in any suitable manner. Intimate contact between the ketone and the acids improves the decolorizing effect. In one embodiment, the phthalic acids are washed on the filter, ketone being employed as the washing liquid. Alternatively the phthalic acids after removal from the filter are admixed with the ketone, preferably wtih agitation, and then allowed to settle from the liquid ketone.

In some instances, the filtered phthalic acids contain a small amount of metallic oxidation catalyst, and it is frequently desirable to remove this catalyst, from the acids. In one embodiment, this is accomplished by agitating the filtered acids with a ketone and allowing the acids to settle. It is found that differential settling occurs with the catalyst concentrating in the bottom of the settling zone. Catalyst can be drawn off from the bottom of the settling zone, which conveniently has conical shape, leaving the settled phthalic acids in the vessel. The supernatant ketone containing color bodies and often monobasic acids selectively dissolved from the phthalic acids can be decanted in known manner.

The treatment with ketone according to the invention is more effective for removal of monobasic acids such as toluic acids from the phthalic acids than a treatment with xylenes for example. In many cases low monobasic acid content is desired in the phthalic acid product, and ketone treatment is a highly effective manner of obtaining this result. The ketone is usually distilled from the extracted monobasic acids, and the latter can be returned to the oxidation zone or otherwise disposed of.

It has been proposed in the prior art to separate isophthalic acid from terephthalic acid by selectively dissolving the isophthalic acid in an alcohol such as methanol, isopropanol, etc. The isopropanol is usually recovered from the solvent phase by distillation of the solvent. The isophthalic acid produced in such operation frequently has undesirable color.

The present invention involves in one embodiment the decolorizing of mixtures of isophthalic acid and terephthalic acid by means of a ketone, preferably acetone, prior to separation of isophthalic acid from terephthalic acid by means of an alcohol. It is also within the scope of the invention to perform decolorization by means of a ketone following such separation by means of an alcohol. However it is preferred that the decolorization precede the separation.

The conditions used in such separation by means of alcohol can be any of those which are known for this method of separation. Generally the temperature will be within the approximate range from room temperature to 400° F., and the amount of alcohol will generally be within the approximate range from 1 to 20 weight units per unit weight of phthalic acid mixture. Various conditions for use in such separation are disclosed in United States Patent No. 2,741,633.

The invention can be applied to phthalic acid mixtures produced by any known process for liquid phase partial oxidation of xylenes, and is effective to remove color bodies and other materials found in products of such oxidations generally.

The following example illustrates the invention:

A mixture of isophthalic acid and terephthalic acid containing about 40 percent terephthalic acid, produced by liquid phase partial oxidation at 300° F. of a mixture of m-xylene and p-xylene, employing substantially pure oxygen and a cobalt naphthenate catalyst in amount to provide 0.05 weight percent of cobalt based on xylene mixture, is filtered from the liquid oxidation products. The phthalic acid mixture is removed from the filter and admixed with acetone in amount to provide 5 cc. of acetone per gram of phthalic acid mixture. The resulting slurry is brought to a boil in order to provide good mixing of the components and break up solid lumps, and the mixture is then cooled to room temperature. The phthalic acids are allowed to settle out from the acetone layer, which has a distinct yellow color. The phthalic acids after separation from the acetone are nearly white in color as compared to the original mixture which was amber. When the separation is performed in a funnel, a small amount of material is withdrawn first from the bottom of the funnel. This material is dark colored as contrasted to the nearly white phthalic acid crystals and is believed to contain cobalt catalyst.

In one embodiment, the phthalic acids after separation from the bulk of the acetone are admixed at 200° F. with isopropanol in a ratio of about 10 cc. of isopropanol per gram of phthalic acid mixture. After intimate contacting, the undissolved terephthalic acid concentrate is filtered from the alcohol solution of isophthalic acid concentrate. The small amount of acetone remaining in the latter is distilled off prior to separation of isophthalic acid from the alcohol phase by distillation of the alcohol therefrom. The isophthalic acid and terephthalic acid products which are obtained are both nearly white.

Because of the absence of azeotrope formation in distillation of mixtures of acetone and xylene, acetone can be readily recovered from the acetone phase obtained in the phthalic acid contacting.

Generally similar results to those described above are obtained employing other ketones such as those previously disclosed. Generally similar results are also obtained in the treatment of individual phthalic acid isomers produced by oxidation of individual xylenes.

In one embodiment, for example, yellow isophthalic acid obtained by cobalt-catalyzed partial oxidation of m-xylene, and substantially free of terephthalic acid, is contacted with 10 cc. of acetone per gram of acid at room temperature, and white isophthalic acid is obtained upon separation of the solid acid from the acetone phase.

In another embodiment, a mixture of phthalic acids as previously described is contacted at room temperature with 10 cc. of isopropanol per gram of mixed acids at room temperature. Undissolved terephthalic acid is filtered from the isophthalic acid solution in isopropanol. Alcohol is distilled from the filtrate to leave a yellow residue of solid isophthalic acid. This residue is treated with acetone as described in the preceding paragraph to obtain white isophthalic acid. The undissolved terephthalic acid is also treated with acetone in similar manner to remove monobasic acids, cobalt catalyst, etc.

The contacting according to the invention is carried out under conditions such that less than 10 weight percent, and preferably less than 5 percent, of the phthalic acid, e.g. isophthalic acid, or acids, e.g. a mixture of isophthalic and terephthalic acids, is dissolved in the ketone. Preferably, the amount of isophthalic acid dissolved in the ketone, when contacting either isophthalic acid alone or a mixture of isophthalic acid and terephthalic acid, is less than 10 weight percent, and preferably less than 5 weight percent, of the isophthalic acid in the material contacted with ketone. The ketone is capable of providing selective removal of color bodies, i.e. removal of substantially all the color bodies while dissolving only a small proportion of the acids.

The invention claimed is:

Process for recovering decolorized isophthalic acid and terepthalic acid from products of cobalt-catalyzed liquid phase partial oxidation of m-xylene and p-xylene which comprises contacting a phthalic acid mixture comprising said products with 1 to 10 weight units of a ketone having up to 6 carbon atoms, per unit weight of phthalic acid mixture, separating the resulting mixture into a dark colored material at the bottom, decolorized phthalic acids, and a ketone layer containing color bodies, contacting the separated phthalic acids with 1 to 20 weight units of an alcohol having 1 to 3 carbon atoms, per unit weight of phthalic acid mixture, separating the resulting mixture into an alcohol phase containing dissolved isophthalic acid and an undissolved decolorized terephthalic acid phase, and recovering decolorized isophthalic acid from the alcohol phase.

References Cited in the file of this patent

UNITED STATES PATENTS

| | | |
|---|---|---|
| 2,741,633 | McKinnis et al. | Apr. 10, 1956 |
| 2,785,198 | Grosskinsky et al. | Mar. 12, 1957 |
| 2,840,604 | Feighner et al. | June 24, 1958 |

FOREIGN PATENTS

| | | |
|---|---|---|
| 635,088 | Great Britain | Apr. 5, 1950 |